Patented Jan. 2, 1951

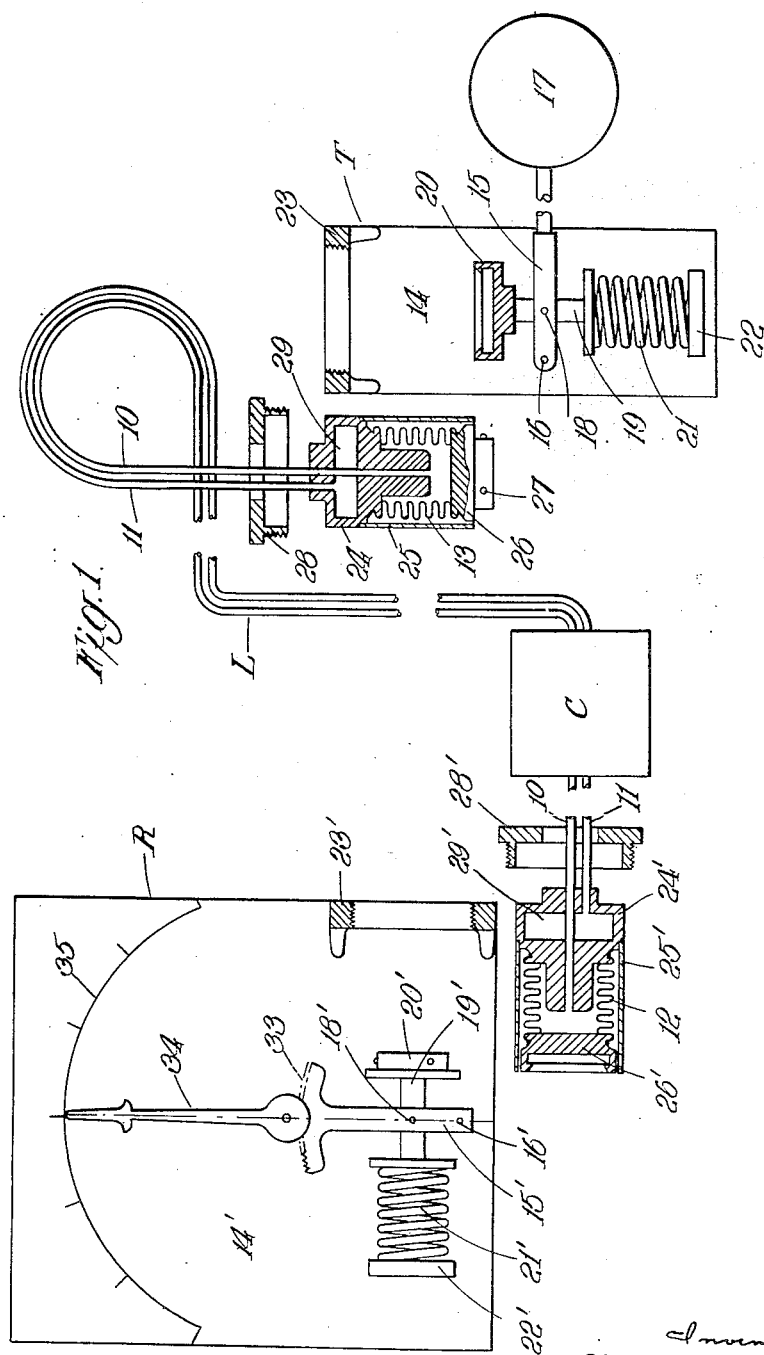

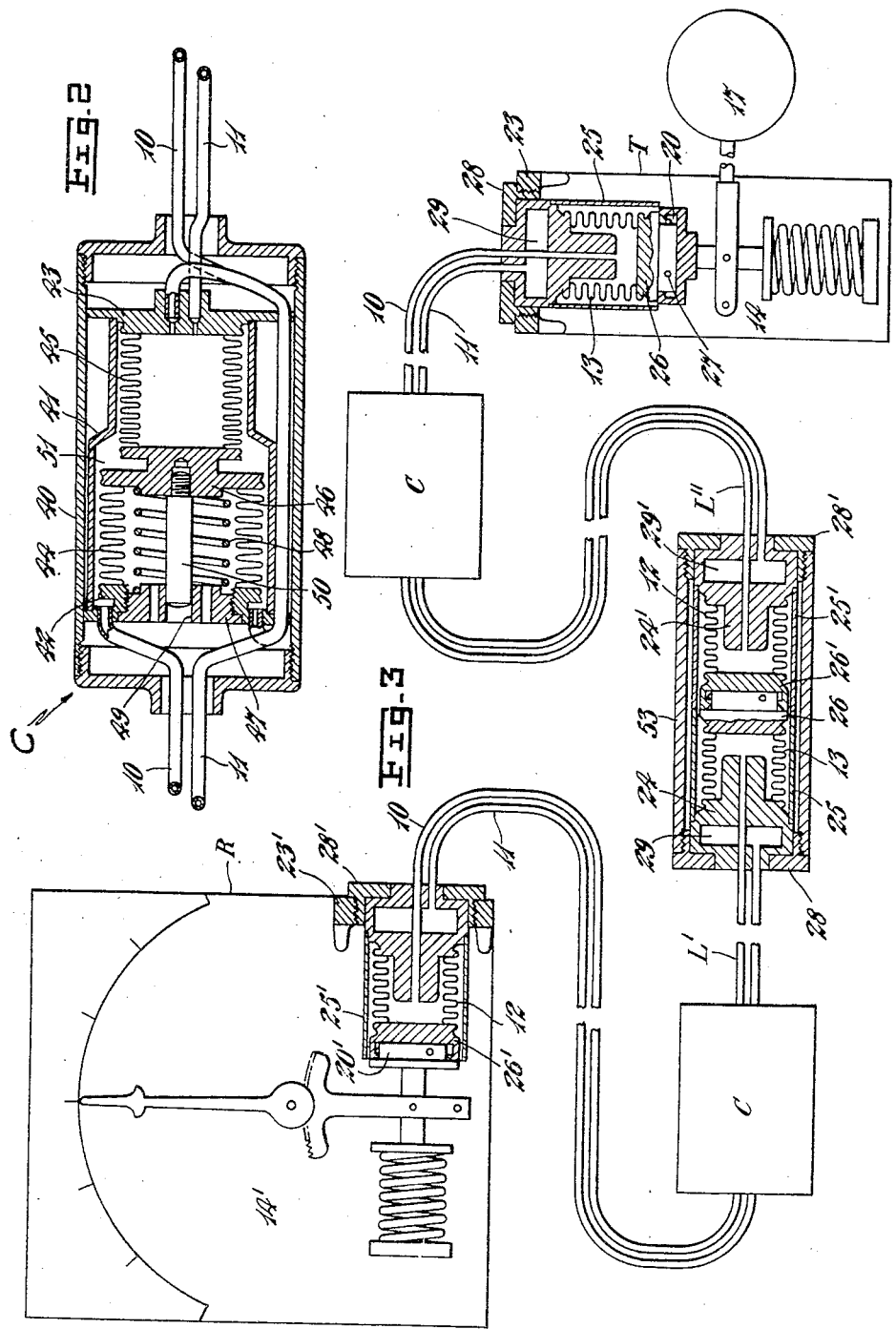

2,536,628

UNITED STATES PATENT OFFICE 2,536,628

TRANSMISSION LINE AND TEMPERATURE COMPENSATING MEANS FOR HYDRAULIC SYSTEMS

Alexander Constantine Denisoff, Middlesex, England, assignor to West Road Co. Limited Application October 11, 1944, Serial No. 558,113
In Great Britain March 28, 1944

18 Claims. (Cl. 60—54.5)

1

This invention relates to hydraulic remote control or indicating systems of the kind in which the contractions of a deformable transmitting chamber produces a displacement of liquid through a pipe line to in turn produce a corresponding expansion of a deformable receiving chamber. For the purpose of this specification, a system of the kind having a single transmitting chamber and a single receiving chamber connected by means of a single pipe line will be described as a single phase system which, following the well known electrical analogy, may be compared with a multiphase system in which transmitter and receiver comprise a plurality of pairs of deformable chambers connected with each other by pipe lines such that when, at the transmitter, one chamber is contracted and another chamber is expanded there will be at the receiver a corresponding expansion of one chamber and contraction of another chamber. Descriptions of such multiphase systems may be found in British Patents Nos. 543,340, 548,295 and 539,181 which show respectively two, three and four phase systems. In practice the deformable chambers of these systems take the form of bellows of the type sometimes known as "Sylphons" and will be referred to as bellows hereinafter.

Hitherto the most generally used of these systems has been of the two phase type, e. g. as shown in the above mentioned British Patent No. 543,340. There are, however, certain inherent disadvantages in such systems which it is an object of the present invention to overcome. In particular since operation of the transmitter causes liquid to flow, in effect, out of one of the bellows of the transmitter round the system and into the other bellows of the transmitter, and since the pipes connecting transmitter and receiver are of relatively small bore the time taken before equilibrium is reached is appreciable. For this reason if the transmitter is operated suddenly excessive pressures may be set up in the liquid which may strain the bellows beyond their elastic limit so that the system is rendered permanently inaccurate, or even burst the bellows. Furthermore the reduction in pressure set up in the line leading to the transmitting bellows which is being expanded may cause the liquid column to break and thus put the system out of action.

A further disadvantage inherent in these systems arises from the fact that owing to the care required in filling the system with liquid it is usually preferred to do this before installation of the system in its working position. In some applications the installation of the filled system may present serious difficulties, for example, on a ship where undesirably large holes may have to be cut in bulkheads through which to pass the transmitter or receiver.

It is accordingly the object of the present invention to provide an hydraulic remote indicating or control system which overcomes the above mentioned disadvantages.

A principal object of the present invention is to provide a single phase transmitting system.

A further object of the invention is to provide a single phase transmitting system in which the transmission line is formed as a sealed unit, including a temperature compensating device, detachable from the actuating and actuated apparatus.

A still further object of the present invention is to provide a transmission system having a sealed detachable transmission line which may be coupled to the actuating and actuated apparatus or to a further similar transmission line.

Another object of the invention is to provide improved temperature compensating means.

Other objects and advantages of the present invention will become apparent during the course of the following description with reference to the drawings in which:

Fig. 1 shows diagrammatically a single phase transmitting system having a detachable transmission line with certain parts in section and with some parts disconnected;

Fig. 2 shows on a somewhat larger scale, and in section, a temperature compensating device for use in the arrangement of Fig. 1; and Fig. 3 is a view with certain parts in section, similar to that of Fig. 1 with the actuating and actuated apparatus connected up to a transmission line, the view showing a coupling unit for joining together a plurality of separate sealed transmission line units.

Referring now to Fig. 1 there is shown diagrammatically a transmission system in accordance with the invention comprising actuating apparatus T, actuated apparatus R and a detachable transmission line L for connection therebetween. Although for the purposes of illustration the actuating apparatus T is shown operated by a float 17 and the actuated apparatus is shown operating an indicating pointer 34 it will be appreciated that the actuating apparatus may be operated by any other suitable means and that the actuated apparatus may be used to operate other devices.

The transmission line L comprises a temperature compensating device C, two pipe lines 10 and 11, and the bellows 12 and 13. Pipe line 10 is the working line through which transmission is effected and it communicates at each end with the interior of the bellows 12 and 13 while pipe line 11 forms part of the temperature compensating arrangement. The construction and operation of the temperature compensating device C will be described below with reference to Fig. 2.

As stated the transmission line L is detachable from the actuating and actuated apparatus and it is so drawn in Fig. 1. The actuating apparatus T comprises a base 14 having an arm 15 pivotally mounted at 16 thereon and carrying a float 17. Pivotally connected with arm 15 at 18 is a link 19 to one end of which a socket member 20 is secured. The other end of link 19 is connected with a spring 21 which extends between link 19 and a fixed abutment 22. At the other end of base 14 is secured an upstanding threaded ring member 23. The bellows 13 is connected at one end with a fixed head 24, to which is secured a tubular shield 25, and at the other end with a movable plug shaped head 26 which is provided with spring pressed balls 27 and is adapted to engage socket 20 with a snap fastening action. To couple the transmission line L with the actuating apparatus T the bellows 13 is passed through the ring member 23 until the plug 26 snaps into the socket 20 and is secured in position by the gland nut 28 against the action of the spring 21.

The actuated apparatus comprises a base 14' on which is pivotally mounted at 16' an arm 15' to the free end of which is secured a toothed quadrant 33. Pivotally connected at 18' with the arm 15' is a link 19' formed at one end with a plug member 29'. The other end of the link 19' engages one end of a spring 21', the other end of which is supported by the fixed abutment 22'. The quadrant 33 engages a pinion on the spindle of a pointer 34 which moves over a scale 35. The base 14' of the actuated apparatus R is also provided with an upstanding threaded ring member 23' by which the bellows 12 may be secured in position by gland nut 28' in the same manner as the bellows 13 is secured to the actuating apparatus. The transmitting and receiving ends of the transmission line L are identical in construction except that whereas at the transmitting end the movable head 26 of bellows 13 is formed with a plug element, at the receiving end the movable head 26' of bellows 12 is formed with a socket element. The bellows 12 is connected with a fixed head 24' to which the tubular shield 25' is secured. It will be appreciated that when the transmission line is coupled to the actuating and actuated apparatus the springs 21 and 21' will be compressed and so hold the plug and socket couplings of the bellows 12 and 13, with the links 19' and 19 respectively firmly together. It may be pointed out here that the springs 21 and 21', the bellows 12 and 13 and also the bellows of Figs. 2 and 3 are drawn in the position they take up when the transmission line is coupled and the float 17 is in the mid position shown, and not in their free unstressed positions.

The operation of the system so far described will be clear. Movement of the float 17 in an upward direction will compress bellows 13 forcing the liquid through pipe 10 to expand bellows 12 and move pointer 34 to the right. A downward movement of the float 17 will compress spring 21 and release the pressure in the liquid and the spring 21' at the actuated apparatus compresses bellows 12 forcing liquid back into the bellows 13. The springs 21 and 21' are preferably selected to have a small spring rate but may be compressed to produce any desired liquid pressure in the system, a suitable value being about 14 lbs. per sq. inch. If desired much higher pressures may however be easily obtained in this way, for example, to ensure positive operation over long lines.

As is well known in these hydraulic systems it is necessary to provide for the changes in volume of the working fluid which occur with changes in temperature and this without affecting the working or accuracy of the system. In the single phase system of the present invention this is effected by compensating means which control the volume of the working part of the system, i. e., the bellows 12 and 13 and pipe line 10, in accordance with the ambient temperature. The compensating means, which take no part in the transmission of movement, comprise the pipe line 11 and the temperature compensating device C.

A preferred form of the temperature compensating device C is shown in Fig. 2. A cylindrical outer casing 40 encloses a tubular chamber 41 to the ends of which are sealed the heads 42 and 43 of the bellows 44 and 45. The adjacent ends of the two bellows are sealed to a common head 46 which is movable axially in respect to the casing 40. The head 42 of bellows 44 is formed with an aperture which is closed by the threaded insert 47 and a spring 48 under compression is housed within the bellows 44 between insert 47 and the common head 46. The insert 47 is provided with a central aperture 49 which acts as a bearing for the guide pin 50 which is screwed into the head 46 and acts to prevent lateral movement thereof. The space within the bellows 44 may be open to the atmosphere as shown or if desired it may be sealed. The bellows 45 is connected with the compensating line 11 while the space 51 bounded by the tubular member 41 and the bellows 44 and 45 is connected with the working line 10.

The temperature compensating device operates as follows. As shown in Fig. 1 the compensating line 11 extends over the whole length of the working line 10 and is therefore subjected to the same temperature changes as the working line. Considering an increase of temperature over the whole system the liquid in the compensating line will expand and will thus cause the bellows 45 to expand urging the head 46 to the left against the action of the spring 48 which has a small spring rate but is set to give a considerable bias pressure. At the same time the bellows 44 will be compressed and the volume of the space 51 will increase to accommodate the increased volume of the liquid in the working line 10 and the bellows 12 and 13 connected therewith. On a fall in temperature the liquid in the compensating system will contract and the spring 48 will then act to move head 46 to the right contracting bellows 45 and also the space 51. The whole system is so proportioned that this change in volume of the space 51 is exactly that required to accommodate the increase or decrease in volume of the liquid in the working line. To this end the volume of liquid in the working and compensating lines is preferably the same and to make up for the volume of the bellows 12 and 13, connected with the working line, the heads 24 and 24' of these bellows are formed with cavities 29 and 29' connected with the compensating line and equal in volume to the volume of the bellows at its mean position. In addition the volume of the space 51 in the compensating device may be made equal to the volume of the bellows 45 and in the case of equal total volumes the effective area of the bellows 44 must be twice that of the bellows 45. Differences in the total volumes of the working and compensating systems may be taken care of by a suitable adjustment of the ratio of the effective areas of the bellows 44 and 45. Where, however, it is difficult to select bellows having the required area ratio a very simple adjustment is possible by modifying the coefficient of expansion of the liquid in one part of the system. Thus the working part may be filled with the normal transmitting liquid and the compensating part may be filled with a mixture of liquids that gives a suitable and different coefficient of expansion.

The bellows 45 does all the work in moving the head 46 to the left against the action of the spring 48 since, owing to the very small compressibility of liquids any slight pressure changes occurring in the working part of the system due to changes in ambient temperature will be absorbed by the receiving bellows 12 without noticeable movement. Similarly, the operation of the transmission line will not affect the compensating device since any change of pressure in the transmission line 10, due to movement of the transmitter bellows 13, will be unable to produce any noticeable movement of the bellows of Fig. 2, for the position of the common head 46 of the bellows is entirely controlled by the liquid volume of the compensating line 11, which can be considered as constant for all reasonable pressure changes.

It may be pointed out here that the volume of a common bellows which is kept at a constant length, varies slightly with the hydraulic pressure. This "bulging" effect is perfectly elastic and linear starting from a certain small pressure and up to the highest pressure to which the bellows can be subjected without permanent deformation, and can therefore be allowed for and automatically compensated by taking a correct ratio for the effective areas of the bellows 44 and 45.

Fig. 3 shows the actuating and actuated apparatus of Fig. 1 connected together by two transmission lines L', L" which are like transmission line L of Fig. 1 and which are coupled together by engaging the plug element of bellows 13 in line L' in the socket element of bellows 12 in line L". The ends of the adjacent tubular shields 25 and 25' abut and space the heads 24 and 24' of the two bellows the correct distance apart while the whole arrangement is rigidly secured together by the gland nuts 28 and 28' which are screwed into the cylindrical cover member 53. This cover member 53 is the only additional element required to complete the coupling, all other components forming part of the complete transmission line shown in Fig. 1.

It will be appreciated that the invention provides a system in which the whole transmission line is detachable from the actuating and actuated apparatus. The line is complete in itself and fully temperature compensated. It may be filled and sealed during manufacture under the best conditions and if for any reason during service it becomes faulty it may be replaced quickly and easily by a new line without any loss in accuracy of transmission and without recalibration of the system. In practice the transmission lines may be made in a few standard lengths and longer lines obtained by coupling such lengths together in the manner shown in Fig. 3. Each section of such a line is fully temperature compensated and no special precautions have to be taken in order to obtain satisfactory operation. It may also be pointed out that the maximum diameter of any part of the completed transmission line may be kept small, of the order of one inch and a half or so, thus greatly simplifying installation.

As compared with a two phase system, the single phase system of the present invention is very much simpler and cheaper to construct, it is faster in operation, and is inherently more accurate. In this connection it may be mentioned that the temperature compensation is twice as accurate as that possible for a two phase system. This is so because, in the case where the receiver is at a different temperature to the transmitter, although the two phase system may be perfectly compensated at one position of the transmitter, e. g. when the two bellows are of equal volume, at any other position the compensation will not be exact and will become increasingly inaccurate as the volumes of the bellows depart from equality in proportion to the ratio of the volumes. In the case of the single phase system of the present invention there is only one bellows and the volume of the chamber in the head of the bellows connected with the compensating line is of course constant. The possible error of the compensating system is therefore reduced by one half as compared with the two phase system. Moreover since the static pressure of the liquid in the system may be held at any suitable value (having due regard to the strength of the bellows used) by giving the springs 21 and 21' an appropriate bias compression, positive operation under almost any condition may be secured.

The system in accordance with the invention is also automatically protected against damage occasioned by a too rapid movement of the actuating apparatus, which as a rule happens during installation of the hydraulic transmission. A sudden downward movement of the float 17 cannot cause any damage since the liquid column in the line will break, release the excessive pressure, and then quickly will be joined again by the action of the spring 21' at the actuated apparatus thus re-establishing working conditions. Additionally the plug and socket coupling of the bellows 13 with the actuating apparatus may be such that it pulls apart if the tension exceeds a pre-determined maximum value. On the other hand, a sudden upward movement of the float 17 may cause a momentarily excessive pressure in the liquid and to avoid damage to the bellows 13 the spring 48 of the temperature compensating device, which preferably is placed not far from the actuating apparatus, is given such a bias pressure that it allows the liquid column in the compensating line to break when subjected to a pull exceeding a pre-determined maximum value, which in turn allows the common head 46 to move to the left thus releasing the excessive pressure in the transmitting line. As soon as the excessive pressure is released, the spring 48 will rapidly act to re-establish working conditions.

The greater accuracy of the system of the present invention may be accounted for by the simple and robust construction used. In particular the rigid mounting of the transmitting bellows almost entirely prevents buckling and the absence of pivoted links and similar parts results in a minimum of lost motion. The simple construction of the temperature compensating device of Fig. 2 may be particularly noted in this connection as compared with a known device of this nature in which the adjacent free ends of a pair of axially arranged bellows are arranged to approach and recede from one another by a system of toggle links which permit buckling of the bellows to occur and unless exceedingly well made permit far too much independent movement.

I claim:

1. A hydraulic motion transmitting system comprising a transmission line including a first and second pipe line, a bellows connected with each end of the said first pipe line, temperature compensating means arranged intermediate the ends of the transmission line comprising a tubular member enclosing a pair of bellows arranged end to end, the remote ends of said pair of bellows being sealed to said tubular member and the adjacent ends of said pair of bellows being sealed to a common head movable axially of said tubular member, a spring under compression enclosed within one of the bellows of said pair and the other bellows being connected with said second pipe line, the space bounded by said tubular member and said pair of bellows being connected with said first pipe line, actuating apparatus including means for varying the length of a bellows connected thereto, actuated apparatus including means responsive to changes in length of a bellows connected thereto and spring means for biasing each of the bellows to a compressed position, and means for detachably securing the bellows of the first pipe line in operative relation with the actuating and actuated apparatus respectively.

2. In a hydraulic transmitting system including an actuating means and an actuated means connected by a transmission line which in turn is connected into a temperature compensating device, an improved temperature compensating device comprised essentially of a pair of deformable chambers mechanically coupled so that they expand and contract as one, comprising a tubular member, a first bellows arranged inside said member and having a head sealed to one end of said member, a second bellows arranged coaxially inside said member and having a head sealed to the other end of said member, a common head movable axially of said tubular member and to which the adjacent ends of the two bellows are sealed, a spring under compression arranged within said first bellows between the heads thereof, said second bellows and the space bounded by the tubular member and the two bellows forming the two said deformable chambers, the transmission line being connected into one of said deformable chambers, and a temperature compensating line connected into the other deformable chamber.

3. In a hydraulic transmitting system including an actuating means and an actuated means connected by a transmission line which in turn is connected into a temperature compensating device, an improved temperature compensating device comprised essentially of a pair of deformable chambers mechanically coupled so that they expand and contract as one, comprising a tubular member, a first bellows arranged coaxially inside said member and having a head sealed to one end of said member, a second bellows of different diameter arranged coaxially inside said member and having a head sealed to the other end of said member, a common head movable axially of said tubular member to which the adjacent ends of the two bellows are sealed, guide means for said common head comprising a pin secured thereto and extending axially of the tubular member through said first bellows and journaled in the head thereof, a spring under compression arranged in said first bellows between the heads thereof, the second bellows and the space bounded by the tubular member and both of said bellows forming the said two deformable chambers, the transmission line being connected into one of said deformable chambers, and a temperature compensating line connected into the other deformable chamber.

4. In a hydraulic motion transmitting system a plurality of liquid filled transmission line units interposed in series, each of said transmission line units including a pipe line, a liquid filled bellows connected onto each end of said pipe line, a plug element on the bellows at one end of the line of each unit, a socket element on the bellows at the other end of the line of each unit, the plug element fitting the socket of the socket element, and means for connecting adjacent ends of interconnected transmission line units including means for maintaining the plug element of a bellows of one pipe line in operative engagement with the socket element of a bellows of the adjacent pipe line.

5. In a hydraulic motion transmitting system as defined by claim 2 in which said second bellows is of smaller diameter than the first bellows.

6. A hydraulic motion transmitting system comprising a transmission line unit which is readily detachable from the system including a liquid filled pipe line, a liquid filled bellows connected with said pipe line at one end thereof, said bellows having a fixed end and a movable end and forming a transmitting bellows, a liquid filled bellows connected with said pipe line at the other end thereof, said second bellows having a fixed end and a movable end and forming a receiving bellows, actuating apparatus including a fixed housing for the transmitting bellows, means for varying the length of the transmitting bellows, means for detachably securing the fixed end of the transmitting bellows to the housing with the movable end of the bellows in operative position with regard to the said varying means of the actuating apparatus, means for fastening the movable end of the transmission bellows to the varying means, said fastening means comprising a pair of complementary detachable elements respectively on the movable end of the transmission bellows and on said varying means, actuated apparatus including a fixed housing for the receiving bellows, means responsive to change in length of the receiving bellows, means for detachably securing the fixed end of the receiving bellows to the housing of the actuated apparatus with the movable end of such receiving bellows in operative position with regard to the said responsive means of the actuated apparatus, and means for fastening the movable end of the receiving bellows to the responsive means comprising complementary detachable fastening elements respectively on the movable end of the receiving bellows and on said responsive means, the fastening elements on the transmitting and receiving bellows being complementary to each other, said transmission line forming a sealed and self-contained unit which is readily detachable from the system.

7. A hydraulic motion transmitting system according to claim 6, characterized by including a temperature compensating means comprising a liquid-filled chamber in the fixed end of each of said bellows, a second liquid filled pipe line paralleling the said pipe line and terminating respectively in the liquid filled chambers formed within the fixed ends of the transmitting and receiving bellows.

8. A hydraulic motion transmitting system comprising actuating apparatus, actuated apparatus and a motion transmission line interposed between said actuating and actuated apparatus, a socket element on one of said apparatus and a plug element on the other, said line comprising a plurality of replaceable pipe line units connected in series, each pipe line unit including a pipe having a bellows connected thereto at each end, the bellows at one end of each pipe line unit having a plug element and the bellows at the other end of the pipe line having a socket element, the adjacent plug and socket elements of the pipe line units being connected together and the plug and socket elements at the ends of the transmission line being connected in operative relationship with socket and plug elements of the actuating and actuated apparatus.

9. In a hydraulic motion transmitting system comprising actuating apparatus, actuated apparatus and a transmission line interposed between said actuating and actuated apparatus, a transmission line formed as a sealed and self-contained unit and comprising a pipe line, a bellows connected to each end of the pipe line and having a fixed end and a movable end, temperature compensating means connected to said pipe line and comprising a pipe line paralleling the first mentioned pipe line and terminating in chambers formed within the fixed ends of the respective bellows, and means for detachably securing the fixed end of the bellows at the ends of the pipe line to the actuating and actuated apparatus respectively.

10. In a hydraulic motion transmitting system, a transmission line comprising a pipe line, a bellows connected to each end of the pipe line, each bellows having a fixed head, and temperature compensating means connected into said pipe line, said temperature compensating means comprising a pipe line paralleling the first mentioned pipe line and terminating in chambers formed within the fixed heads of the respective bellows.

11. In a hydraulic motion transmitting system, an improved motion transmission line comprising a plurality of interconnected readily replaceable pipe line units connected in series, each pipe line unit including a pipe having a bellows connected thereto at each end, each bellows having a fixed end and a movable end, a tubular sleeve surrounding each bellows and secured to the fixed end thereof, means for securing the adjacent bellows of adjacent pipe line units together with the movable ends of the respective bellows in engagement with each other and with the projecting ends of the sleeves thereof abutting each other so as to space the fixed ends of the engaging bellows the correct distance apart and readily detachable fastening means between the movable ends of said bellows, connecting said movable ends together.

12. A control apparatus, comprising a tubular member, a pair of bellows arranged end to end within the tubular member, the remote ends of said pair of bellows being sealed to said tubular member and the adjacent ends of said pair of bellows being sealed to a common head movable axially of said tubular member, a spring under compression mounted within one of the bellows of said pair, and a pair of parallel fluid-filled lines connected respectively into the belows not containing the spring and the space bounded by said tubuar member and said pair of bellows.

13. An improved temperature compensating device, comprising essentially a pair of deformable chambers mechanically coupled so that they expand and contract as one, including a tubular member, a first bellows arranged inside said member and having a head sealed to one end of said member, a second bellows arranged coaxially with the first bellows inside said member and having a head sealed to the other end of said member, a common head movable axially of said tubular member and to which the adjacent ends of the two bellows are sealed, and a spring under compression arranged within said first bellows between the heads thereof, said second bellows and the space bounded by the tubular member and the two bellows forming the two said deformable chambers.

14. A control apparatus, comprising a tubular member, a first bellows arranged coaxially to and inside said member and having a head sealed to one end of said member, a second bellows arranged coaxially inside said member and having a head sealed to the other end of said member, a common head movable axially of said tubular member to which the adjacent ends of the two bellows are sealed, guide means for said common head comprising a pin secured thereto and extending axially of the tubular member through said first bellows and journaled in the head thereof, and a spring under compression arranged in said first bellows between the heads thereof.

15. A hydraulic system comprising a transmission line unit including a pipe line, an expansible and contractible bellows connected to each end of said line and opening thereinto, the end of each bellows connected to said pipe line being adapted for mounting in fixed position while the other end is movable, the movable end of each bellows including a detachable fastening element, said fastening elements for the two bellows being complementary to each other and comprising the elements of a complementary detachable fastening means, whereby said unit may be readily replaced by a similar unit or connected in series with a similar unit.

16. A hydraulic system as defined by claim 15 in which said complementary fastening elements are the elements of a snap fastening means.

17. A hydraulic system as defined by claim 15 in which one of said fastening elements is a plug element and the other fastening element is a socket element.

18. A hydraulic system comprising a transmission line unit including a pipe line, a bellows having a fixed head connected to each end of the pipe line, each bellows having a movable end, a chamber in the head of each bellows unconnected with the bellows or the pipe line, a temperature compensating pipe line paralleling said pipe line and having its ends respectively connected into the chambers of said bellows, and a temperature compensating device for accommodating expansion and contraction of liquid in said lines connected into both of said lines.

ALEXANDER CONSTANTINE DENISOFF.

(References on following page)

REFERENCES CITED

The following references are of record in the file of this patent:

UNITED STATES PATENTS

| Number | Name | Date |
|---|---|---|
| 1,862,569 | Gargan | June 14, 1932 |
| 1,881,266 | De Giers | Oct. 4, 1932 |
| 1,934,206 | Page | Nov. 7, 1933 |
| 2,055,347 | Hackman | Sept. 22, 1936 |
| 2,072,693 | Volkert | Mar. 2, 1937 |
| 2,274,254 | Newton | Feb. 24, 1942 |
| 2,352,187 | Ellinwood | June 27, 1944 |
| 2,367,707 | Amery | Jan. 23, 1945 |
| 2,399,505 | Phillips | Apr. 30, 1946 |
| 2,427,591 | Denison | Sept. 16, 1947 |

FOREIGN PATENTS

| Number | Country | Date |
|---|---|---|
| 274,890 | Great Britain | July 12, 1928 |
| 349,914 | Great Britain | May 27, 1931 |
| 543,340 | Great Britain | Feb. 20, 1942 |
| 547,062 | France | Sept. 11, 1922 |
| 771,565 | France | July 30, 1934 |